United States Patent [19]
Hotta et al.

[11] Patent Number: 5,140,467
[45] Date of Patent: Aug. 18, 1992

[54] ZOOMING MONOCULAR OR BINOCULARS

[75] Inventors: Keiichi Hotta; Ryota Ogawa; Hiroyuki Kato, all of Tokyo, Japan

[73] Assignee: Asahi Kogaku Kogyo Kabushiki Kaisha, Tokyo, Japan

[21] Appl. No.: 635,936

[22] Filed: Dec. 28, 1990

[30] Foreign Application Priority Data

Dec. 29, 1989 [JP] Japan ............................ 1-151247[U]

[51] Int. Cl.$^5$ ............................................. G02B 15/00
[52] U.S. Cl. ............................ 359/696; 359/697; 359/698; 359/699; 359/700; 354/400
[58] Field of Search ............... 359/696, 697, 698, 699, 359/700, 701, 694, 740, 739, 404, 407, 410, 418, 420; 354/400

[56] References Cited

U.S. PATENT DOCUMENTS 4,487,482 12/1984 Itoh et al. ......................... 359/643
4,626,077 12/1986 Yamamoto ......................... 359/699

Primary Examiner—Bruce Y. Arnold
Assistant Examiner—Hung Xuan Dang
Attorney, Agent, or Firm—Sandler, Greenblum & Bernstein

[57] ABSTRACT

A zooming monocular or zooming binoculars having an objective optical system and an eyepiece optical system, which includes at least one variable power lens group driven in the optical axis in the eyepiece optical system, a movable field stop which is provided to define the field of view, so as to move in the optical axis direction independently of the variable power lens group, and driving means for moving the movable field stop in association with the movement of the movable variable power lens group in the optical axis direction, along a track different from a track of the movable power lens group.

25 Claims, 15 Drawing Sheets

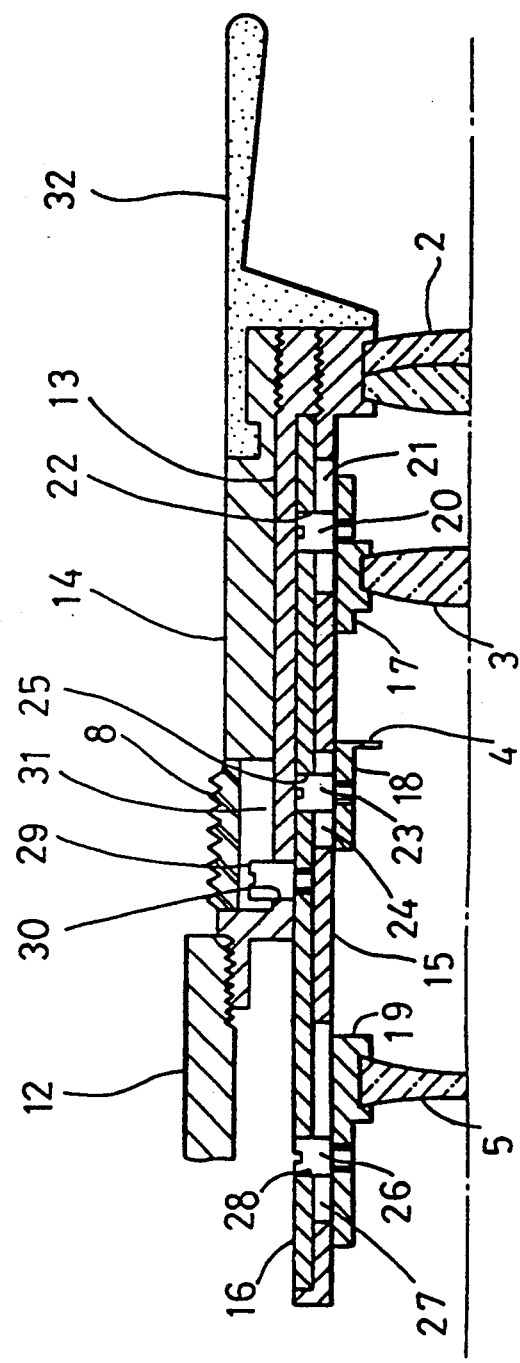

FIG. 3C      FIG. 3B      FIG. 3A
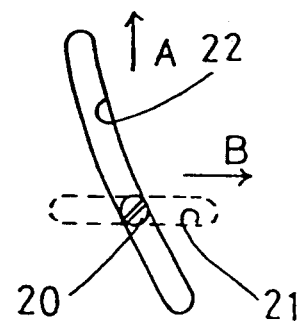
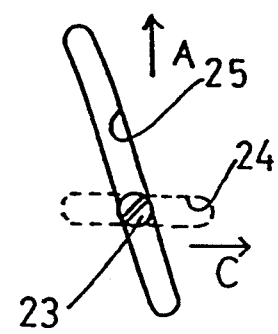
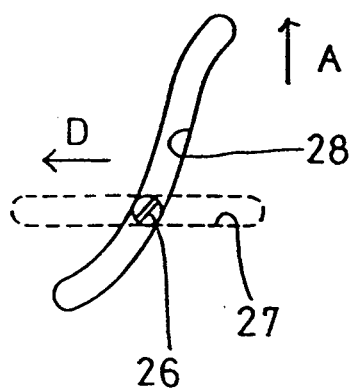
FIG. 4
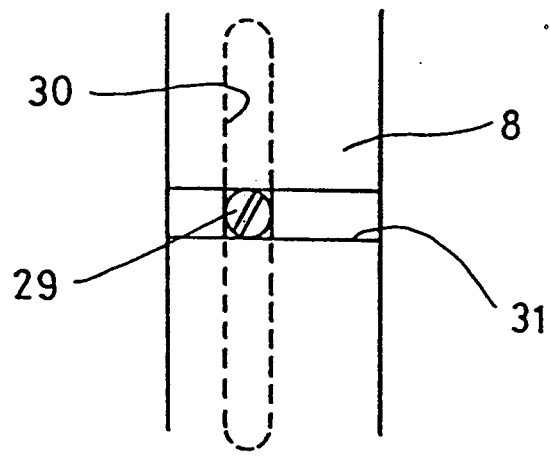

chromatic aberration  chromatic         astigmatism   distortion
spherical aberration  aberration of
                      magnification chromatic aberration  spherical aberration chromatic aberration of magnification astigmatism distortion chromatic aberration spherical aberration | chromatic aberration of magnification | astigmatism | distortion chromatic aberration
spherical aberration chromatic
aberration of
magnification astigmatism distortion chromatic aberration
spherical aberration chromatic
aberration of
magnification astigmatism distortion chromatic aberration
spherical aberration chromatic
aberration of
magnification astigmatism distortion chromatic aberration  spherical aberration | chromatic aberration of magnification | astigmatism | distortion chromatic aberration spherical aberration | chromatic aberration of magnification | astigmatism | distortion

ZOOMING MONOCULAR OR BINOCULARS

BACKGROUND OF THE INVENTION

1. Field of the Invention

The present invention relates to a zooming monocular or zooming binoculars.

2. Description of Related Art

In a known monocular or binoculars, an objective optical system and an eyepiece optical system are necessarily provided. Note that the term "binoculars" referred to hereinafter includes both the binoculars and the monocular. Zooming binoculars of a conventional type have at least one variable power lens group in their objective optical system. In this conventional type binoculars, since a field stop (diaphragm) to determine the field of view is fixed (immovable in the optical axis direction). even though the contour of the field stop is made clear at a specific focal length (magnification), the contour of the field stop becomes unclear at other focal lengths. Due to this unclear contour of the field stop, the circumferential portion of the field of view is dimmed.

SUMMARY OF THE INVENTION

The primary object of the present invention is to eliminate the above-mentioned drawback by moving a field stop (field stop ring) observed through the eyepiece optical system to a position which coincides with the position of an image formed by the objective optical system, regardless of zooming thereof. The movement of the field stop, mentioned above, prevents the occurrence of, dimming of the contour of the field stop regardless of the focal length.

To achieve the object mentioned above, according to the present invention, there is provided a monocular or binoculars having an objective optical system and an eyepiece optical system, comprising at least one variable power lens group which is driven to move in an optical axis direction in the eyepiece optical system, a movable field stop which is provided to define the field of view so as to move in the optical axis direction independently of the variable power lens group, and a driving means for moving the movable field stop in association with the movement of the movable variable power lens group, in the optical axis direction along a track different from the track of the movement of the movable power lens group.

Preferably, another variable power lens group is also provided in the objective optical system so that the variable power lens group can be moved in the optical axis in association with the variable power lens group in the eyepiece optical system.

According to an aspect of the present invention, the movable field stop is located between the the variable power lens group in the objective optical system (objective variable power lens group) and the variable power lens group in the eyepiece optical system (eyepiece, variable power lens group). During continuous change of magnification, from small to large, the objective variable lens group moves forwardly, and the eyepiece, variable power lens group moves rearwardly. At this time, the field stop is arranged to move rearwardly, so that a field of view without dimming of the contour of the field stop is obtained. The rear traveling distance of the movable field stop is, for example, set to be smaller than that of the eyepiece, variable power lens group.

The driving means of the movable field stop can be comprised of a guide pin provided on the movable field stop, a non-rotatable inner cylinder which has a linear movement guide groove in which the guide pin is moveably guided in the optical axis direction, an intermediate cylinder which is rotatably fitted on the inner cylinder and which has a cam groove in which the guide pin is fitted, and a rotational operating means for rotating the intermediate cylinder.

According to another aspect of the present invention, there is provided a zooming monocular or zooming binoculars comprising an objective optical system, an eyepiece optical system which in turn comprises at least one variable power lens group, a movable field stop which is located between the objective optical system and the eyepiece optical system to define the field of view, the movable field stop which is movable in the optical axis, an inner cylinder in which the variable power lens groups and the movable field stop are fitted so as to independently move in the optical axis direction and a single driving means for independently moving the variable power lens groups and the movable field stop, in the optical axis direction at one time.

Another object of the present invention is to provide an afocal, variable power optical device, which can obtain a clear view in a zooming binoculars.

To achieve the object mentioned above, according to the present invention, there is provided the afocal, variable power optical device which comprises an objective optical system located on the object's side of a field stop ring to limit a field stop, and an eyepiece optical system which is located at the eye's side of the field stop ring. In this arrangement, zooming is performed by moving at least one of the systems, and the field stop ring is moved in accordance with the zooming to an appropriate position in which no dimming of the contour of the field stop occurs. Furthermore, in the afocal, variable power optical device mentioned above, the standard diopter for an object at specific distance, which is invariable regardless of variable powering, is set equal to the diopter of the field stop ring which is observed through the eyepiece optical system.

The present disclosure relates to subject matter contained in Japanese Utility Model application No. 1-151247 (filed on Dec. 29, 1989) which is expressly incorporated herein by reference in its entirety.

BRIEF DESCRIPTION OF THE DRAWINGS

The present invention will be described below, in detail, with reference to the accompanying drawings, in which:

FIG. 2 is a longitudinal sectional view of an upper half of an eyepiece optical system used in zooming binoculars according to the present invention;

FIGS. 3A, 3B and 3C are developed plan views of a zooming operational portion of a pair of movable, variable power lens groups and a movable field stop in an eyepiece optical system as shown in FIG. 2; and, FIG. 4 is a developed plan view of an engaging mechanism of a zoom ring and an intermediate cylinder, according to the present invention.

FIG. 5 is a cross sectional view of an upper half of the eyepiece optical system; FIG. 6 is a cross sectional view of a guide pin portion of the device as shown in FIG. 5;

FIG. 7 is a view of the lens at the low magnification; FIG. 8 is a view showing various aberrations during low magnification; FIG. 9 is a view of the lens at middle magnification; FIG. 10 is a view showing various aberrations at the middle magnification; FIG. 11 is a view of the lens at the high magnification; FIG. 12 is a view showing various aberrations at the high magnification;

FIG. 13 is a view of the lens at the low magnification; FIG. 14 is a view showing various aberrations at the time of low magnification; FIG. 15 is a view of the lens at the time of middle magnification; FIG. 16 is a view showing various aberrations at the middle magnification; FIG. 17 is a view of the lens at the high magnification; FIG. 18 is a view showing various aberrations at the high magnification;

FIG. 19 is a view of the lens at the low magnification; FIG. 20 is a view showing various aberrations at the low magnification; FIG. 21 is a view of the lens at the time of middle magnification; FIG. 22 is a view showing various aberrations at the middle magnification; FIG. 23 is a view of the lens at the high magnification; FIG. 24 is a view showing various aberrations at the high magnification.

DESCRIPTION OF THE PREFERRED EMBODIMENTS

Figure 1A:
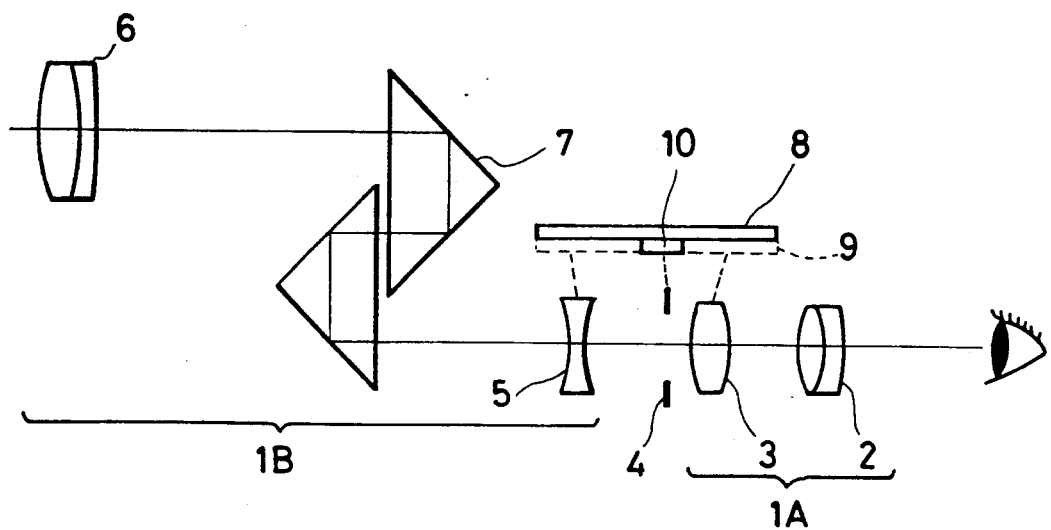
FIGS. 1A and 1B are conceptual views of zooming binoculars, according to the present invention at the smallest magnification and the largest magnification, respectively.
Figure 1B:
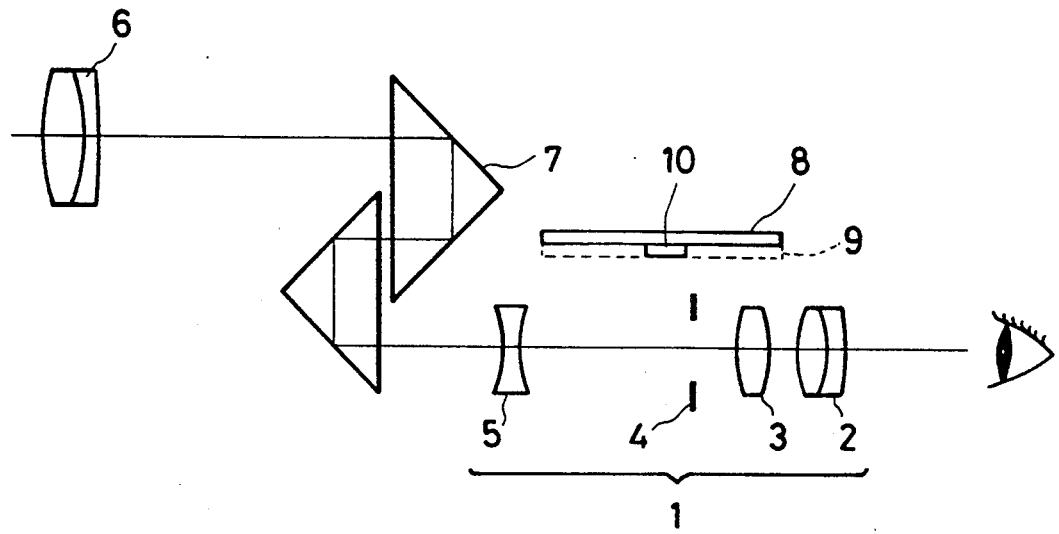

In FIGS. 1A and 1B, which show a basic structure of zooming binoculars according to the present invention. An eyepiece lens system 1A comprises a immovable lens group 2 and a variable power lens group (eyepiece, variable power lens group) 3. An object lens system 1B comprises a variable power lens group (objective variable power lens group) 5, a porro-prism 7 and an immovable lens group 6. A movable field stop 4 is provided between the eyepiece variable power lens group 3 and the objective variable power lens group 5. The variable power lens groups 3 and 5 and the movable field stop 4 move between the smallest magnification position (e.g. 6x) shown in FIG. 1A and the largest magnification position (e.g. 12x) shown in FIG. 1B, during the zooming operation. Specifically, when the magnification changes from the smallest value toward the largest value, the objective variable power lens group 5 moves forwardly and the eyepiece, variable power lens group 3 moves rearwardly to increase the spatial distance therebetween. On the other hand, the movable field stop 4 moves rearwardly to provide a clear field of view without a dimmed circumference.

A pair of the variable power lens groups 3 and 5 are connected to a drive mechanism 9, which converts the rotational movement of a zoom ring 8 to a linear movement of the variable power lens groups 3 and 5 in the optical axis direction. The movable field stop 4 is connected to an association mechanism 10, which is connected to the drive mechanism to convert the rotational movement of the zoom ring 8 to a linear movement of the field stop 4.

In FIGS. 2, 3(3A, 3B and 3C) and 4, neither the immovable lens group 6 nor the porro-prism 7 are shown. An eyepiece lens frame 13 is screw-engaged by one end of a body 12 and is fitted in an outer cylinder 14. The eyepiece lens frame 13 is provided, on its outer periphery of the end adjacent to the body 12, with the zoom ring 8 (single operational member), which is rotatably fitted on the eyepiece lens frame 13.

An inner cylinder 15 is concentrically connected to the inside of the eyepiece lens frame 13. An intermediate cylinder 16 is rotatably fitted between the inner cylinder 15 and the eyepiece lens frame 13.

A frame body 17 which supports the eyepiece variable power lens group 3, a frame body 18 which supports the field stop 4 and a frame body 19 which supports the objective variable power lens group 5 are provided in the inner cylinder 15 so as to move in the optical axis direction. The immovable lens group 2 is secured to an opening end of the eyepiece lens frame 13.

To make it possible to move the eyepiece variable power lens group 3, only in the optical axis direction, a guide pin 20, which is provided on the frame body 17, is engaged in a corresponding linear movement guide groove 21 of the inner cylinder 15 extending int he optical axis direction. The front end of the guide pin 20 is also engaged in a cam groove 22, formed on the peripheral wall of the intermediate cylinder 16, as shown in FIG. 3A.

Similarly, to make it possible to move the field stop 4 only in the optical axis direction, a guide pin 23, which is provided on the frame body 18, is engaged in a corresponding linear movement guide groove 24 of the inner cylinder 15 extending in the optical axis direction. The front end of the guide pin 23 is also engaged in a cam groove 25 formed on the peripheral wall of the intermediate cylinder 16, as shown in FIG. 3B.

Furthermore, to make it possible to move the objective variable lens group 5 only in the optical axis direction, a guide pin 26, which is provided on the frame body 19 is engaged in a corresponding linear movement guide groove 27 of the inner cylinder 15 extending in the optical axis direction. The front end of the guide pin 26 is also engaged in a cam groove 28 formed on the peripheral wall of the intermediate cylinder 16, as shown in FIG. 3C.

The profiles of the cam grooves 22, 25 and 28, shown in FIGS. 3A, 3B and 3C, are such that the necessary zooming operation can be effected according to each magnification and no dimming of the contour of the movable field stop 4 occurs. In other words, the position of an image formed by the objective optical system 1B moves according to the move of the objective variable lens group 5. The eyepiece, variable power lens group of the eyepiece optical system 1A moves to enlarge and clearly observe the above image formed by the object optical system 1B. The field stop 4 is always moved to a position where the image, formed by the objective optical system 1B, of the object at the specific distance is formed. In the illustrated embodiment, the rearward displacement of the movable field stop 4 becomes smaller than that of the eyepiece, variable power lens group 3 as the magnification of the eyepiece lens system 1A changes from the smallest value toward the largest value.

A pin 29, provided on the outer periphery of the intermediate cylinder 16, is fitted in an elongated guide hole 30 which is formed on the peripheral wall of the eyepiece lens frame 13 extending in the circumferential direction. The front end of the pin 29 is engaged in a groove 31 which extends in the optical axis direction on the inner periphery of the zoom ring 8. Consequently, the rotational movement of the zoom ring 8 is transmitted to the intermediate cylinder 16.

The guide pin 20, the linear movement guide groove 21, the cam groove 22, the guide pin 26, the linear movement guide groove 27 and the cam groove 28 as shown in FIG. 2, constitute the drive mechanism 9 in FIG. 1. The guide pin 23, the linear movement guide groove 24 and the cam groove 25 constitute the association mechanism 10 as shown in FIG. 1. In FIG. 2, reference numeral 32 designates an eye cup.

The binoculars as constructed above operate as follows.

When the zoom ring 8 is rotated, for example, in the clockwise direction upon zooming, the rotation of the zooming ring 8 is transmitted to the intermediate cylinder 16 through the groove 31 and the pin 29, so that the intermediate cylinder 16 rotates in the same direction as the zoom ring 8. The rotation of the intermediate cylinder 16, in the clockwise direction, causes the cam grooves 22, 25 and 28 to move in the direction shown at arrow A in FIGS. 3A-3C, so that the guide pin 20, fitted in the cam groove 22, moves in the direction B, along the linear movement guide groove 21, in accordance with the cam profile of the cam groove 22, as shown in FIG. 3A. Simultaneously, the guide pin 23, fitted in the cam groove 25, moves in the direction C along the linear movement guide groove 24 in accordance with the cam profile of the cam groove 25, as shown in FIG. 3B. Similarly, the guide pin 26, fitted in the cam groove 28, moves in the direction D along the linear movement guide groove 27 in accordance with the cam profile of the cam groove 28, as shown in FIG. 3C.

When the guide pins 20, 23 and 26 move in the directions B, C and D, as mentioned above, the eyepiece, variable power lens group 3, the field stop 4 and the objective variable power lens group 5, integral therewith, are moved in the same direction. When the zoom ring 8 is rotated by the maximum displacement in the clockwise direction, the variable power lens groups 3 and 5, and the field stop 4 are brought into a position shown in FIG. 1B. In this state, if the magnification range of the zooming optical system is 6x~12x, the magnification of 12x is obtained.

It should be appreciated that since the field stop 4 is moved to an appropriate position in which no dimming of the field of view occurs, depending on the magnification which varies by the zooming, no dimming of the field stop takes place, thus resulting in a clear field of view.

When the zooming ring 8 is rotated in the counterclockwise direction, the positions of the variable power lens groups 3 and 5, and the field stop 4 are moved from those of FIG. 1B to those of FIG. 1A to reduce the magnification. Also, in this case, since the field stop 4 is moved in accordance with the magnification to an appropriate position in which no dimming occurs, a clear field of view can be ensured. This differs from the prior art in which the circumferential portion of the field of view is dimmed or is partially cut.

Figure 5:
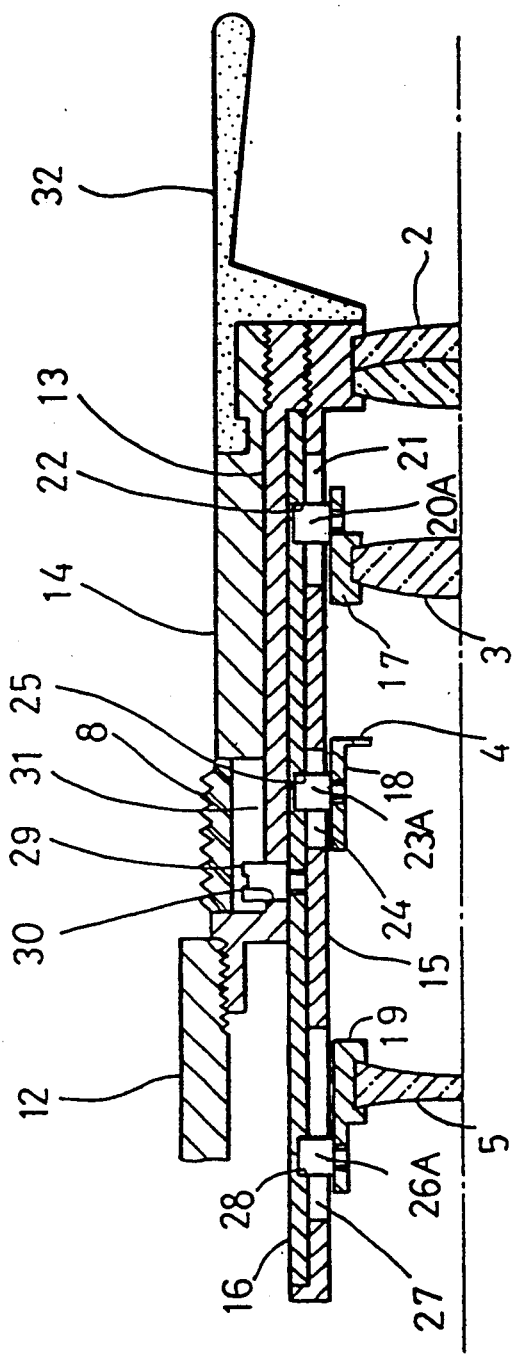
FIGS. 5 and 6 show another embodiment of the present invention.
Figure 6:
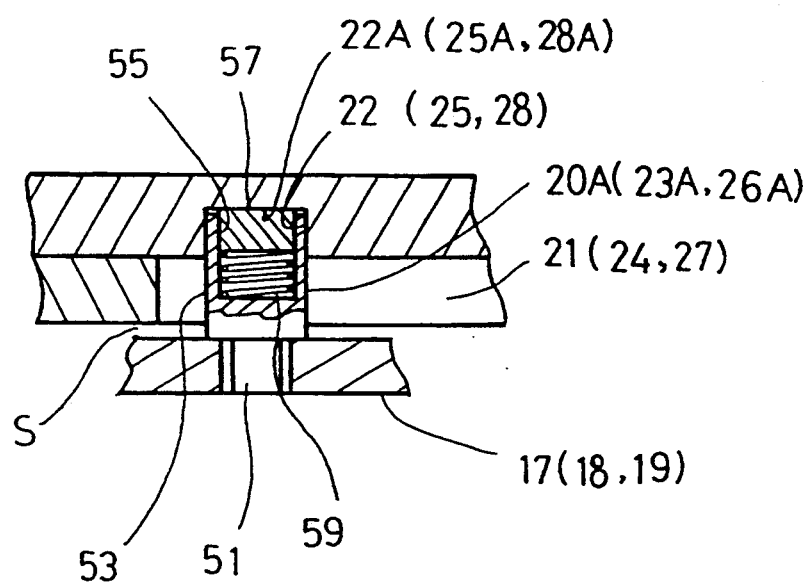

FIGS. 5 and 6 show another embodiment of the present invention. This embodiment is to prevent the frame bodies 17, 18, and 19 from inclining with respect to the optical axis even though the engaging length of these frame bodies to the inner cylinder 15 are short. One end of the guide pin 20A is connected to the frame body 17, and the other end is moveably engaged in the cam groove 22 of the intermediate cylinder 16 and the linear movement guide groove 21 of the inner cylinder 15. Similar to the above, one end of the guide pin 23A is connected to the frame body 18, and the other end is moveably engaged in the cam groove 25 and the linear movement guide groove 24. In addition, one end of the guide pin 26A is connected to the frame body 19, and the other end is moveably engaged in the cam groove 28 and the linear movement guide groove 27.

As shown in FIG. 6, the cam groove 22 (25, 28) has a bottom surface 22A (25A, 28A). A space S is maintained between the outer surface of the frame body 17 (18, 19) and the inner surface of the inner cylinder 15, so that the frame body 17 (18, 19) and the inner cylinder 15 do not come into contact with each other.

The guide pin 20A comprises a male thread portion 51 and a main portion 53 which is engaged in the linear movement guide groove 21 and the cam groove 22. The main portion 53 includes a cylindrical hole 55 having an open end at its outer end.

An annular bar 57 is slidingly inserted in the cylindrical hole 55. The annular bar 57 is pressed in the direction, from which the bar 57 protrudes from the concave portion 55, by a coil spring 59.

Similar to the guide pin 20A, the guide pins 23A and 26A have the concave portion 55 in which the annular bar 57 and the coil spring 59 are assembled.

The guide pins 20A, 23A and 26A are provided on plural spots, for example, the three equiangular locations of the outer periphery of the frame bodies 17, 18 and 19, respectively as in the first embodiment. The linear movement guide grooves 21, 24, and 27 are provided on plural locations, for example, the three locations of the inner cylinder 15, as in the first embodiment. The cam grooves 22, 25, and 28 are also provided on plural locations, for example, the three locations of the intermediate cylinder 16, as in the first embodiment.

According to the arrangement mentioned above, the frame bodies 17, 18, and 19 are always pressed by the coil spring 59 toward the axis of the inner cylinder 15, through the annular bar 57 and the guide pins 20A, 23A, and 26A. Consequently, even in the case where the axial length of the frame bodies 17, 18, and 19 is not enough, the frame bodies 17, 18, and 19 can be supported in a non-contacting manner against the inner cylinder 15. The frame bodies 17, 18, and 19 can be smoothly moved in the axial direction without inclining with respect to the optical axis.

Following are the three examples of the lens arrangements of the eyepiece optical system of the present invention. In the examples below, a standard diopter of an object at the specific distance, which is not varied by magnification-change, is set to be the −1 diopter. The diopter of the field stop, which is observed through the eyepiece optical system, is set to the −1 diopter.

First Example of The Lens Arrangement

Figure 7:
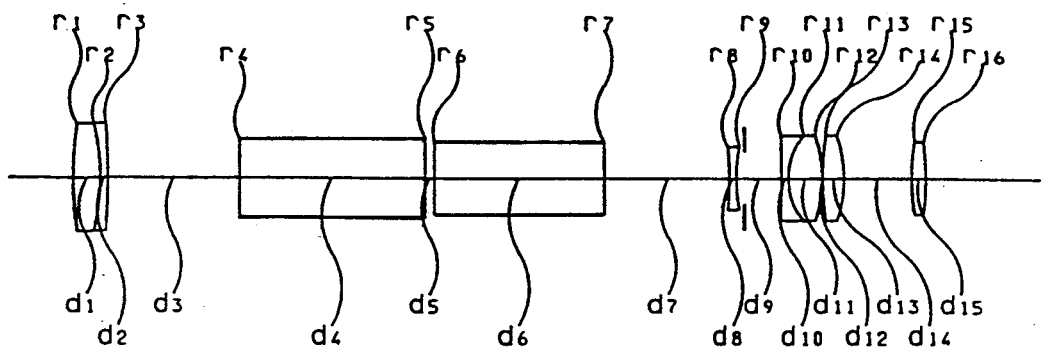
FIGS. 7 through 12 show the first example of the lens arrangement.
Figure 9:
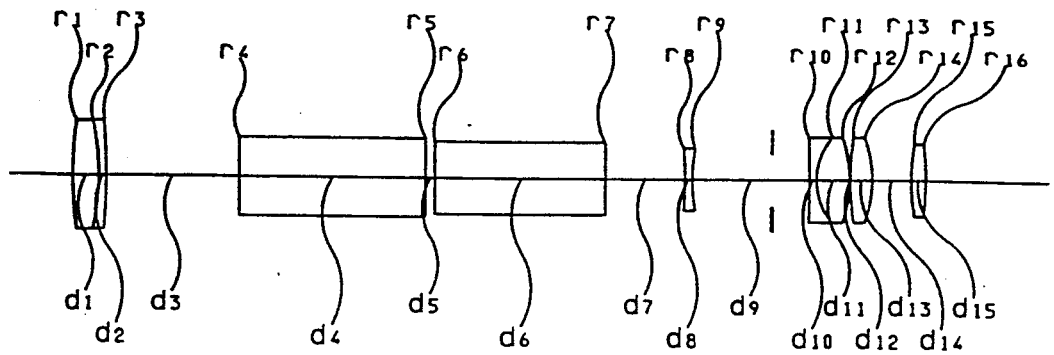
Figure 11:
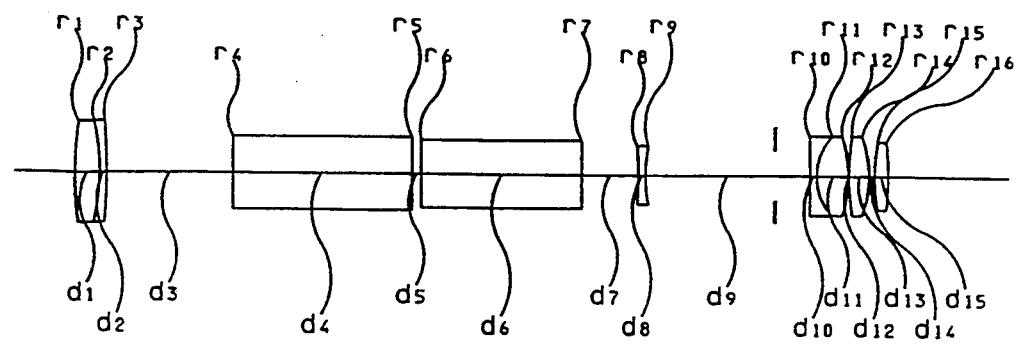

FIGS. 7, 9, and 11 show the first lens arrangement of the variable power optical system of the present invention. FIG. 7 shows an arrangement during low magnification; FIG. 9 shows an arrangement at the middle magnification; and FIG. 11 shows an arrangement at the high magnification.

The values related to the above figures are shown in Table 1. The legends in Table 1 are as follows:
r: radius of curvature of lens surface
d: thickness of lens, or interval of lenses
n: refractive index of lens
v: Abbe's number
$f_0$: focal length of object optical system
$f_e$: focal length of eye piece optical system ω: half field angle In the first arrangement of lens, magnification is changed in accordance with the changes of d7, d9, and d14. The values showing the changes are shown in Table 2. The surfaces from the fourth to the seventh are surfaces of an erect prism.

Figure 8:
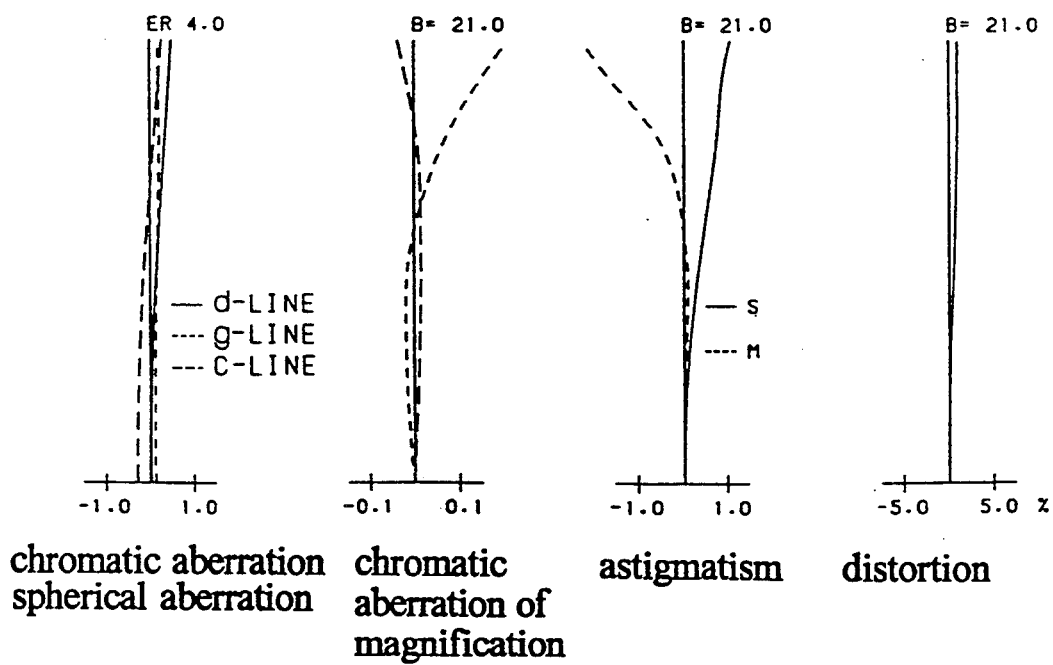
Figure 10:
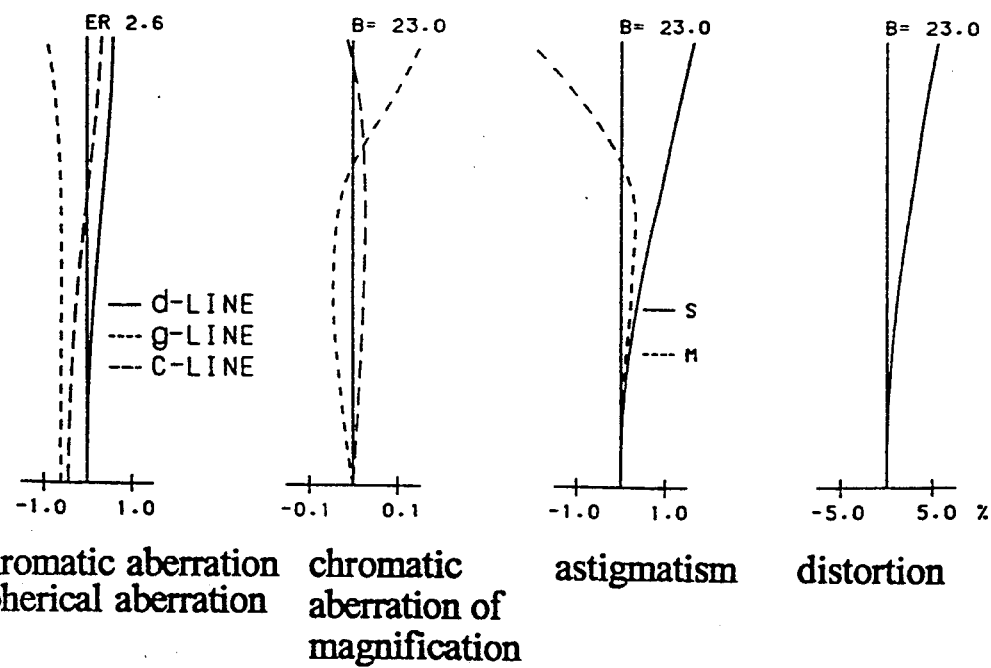
Figure 12:
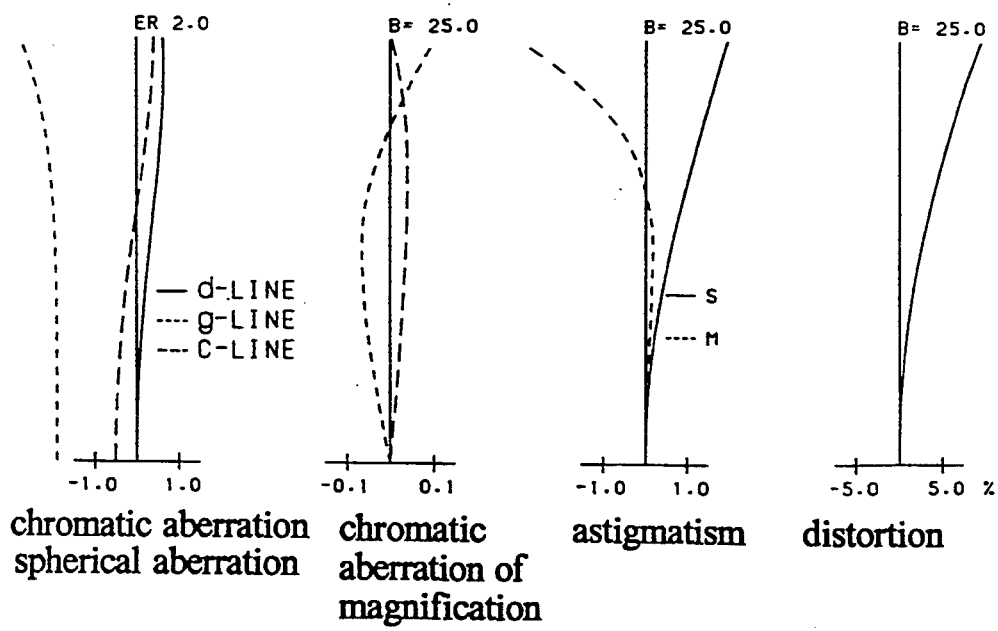

Aberrations at the low magnification in this arrangement are shown in FIG. 8, the middle magnification in FIG. 10, and the high magnification in FIG. 12, respectively.

TABLE 1

| Surface No. | r | d | n | ν |
|---|---|---|---|---|
| 1 | 63.811 | 4.79 | 1.51633 | 64.1 |
| 2 | −38.439 | 1.31 | 1.62004 | 36.3 |
| 3 | −117.465 | 23.76 | | |
| 4 | infinity | 33.26 | 1.56883 | 56.3 |
| 5 | infinity | 1.58 | | |
| 6 | infinity | 30.09 | 1.56883 | 56.3 |
| 7 | infinity | variable | | |
| 8 | −70.480 | 1.31 | 1.51633 | 64.1 |
| 9 | 26.398 | variable | | |
| 10 | −322.719 | 1.31 | 1.80518 | 25.4 |
| 11 | 11.419 | 5.82 | 1.71300 | 53.8 |
| 12 | −23.749 | 0.17 | | |
| 13 | 55.560 | 3.72 | 1.51633 | 64.1 |
| 14 | −21.238 | variable | | |
| 15 | 35.161 | 2.56 | 1.51633 | 64.1 |
| 16 | −54.737 | | | |

TABLE 2

| | Magnification | | |
|---|---|---|---|
| | Low | Middle | High |
| $f_o$ | 100.00 | 133.95 | 158.93 |
| $f_e$ | 16.69 | 15.02 | 13.36 |
| ω (°) | 3.50 | 2.50 | 2.08 |
| d7 | 23.27 | 14.41 | 10.30 |
| d9 | 7.03 | 21.13 | 31.71 |
| d14 | 12.28 | 7.04 | 0.57 |

Table 3 shows the distance between the field stop ring and the phase "r10" which is the closest to the object's side in the eye piece optical system.

TABLE 3

| | Magnification | | |
|---|---|---|---|
| | Low | Middle | High |
| r10 | −6.54 | −7.24 | −7.83 |

Second Example of The Lens Arrangement

Figure 13:
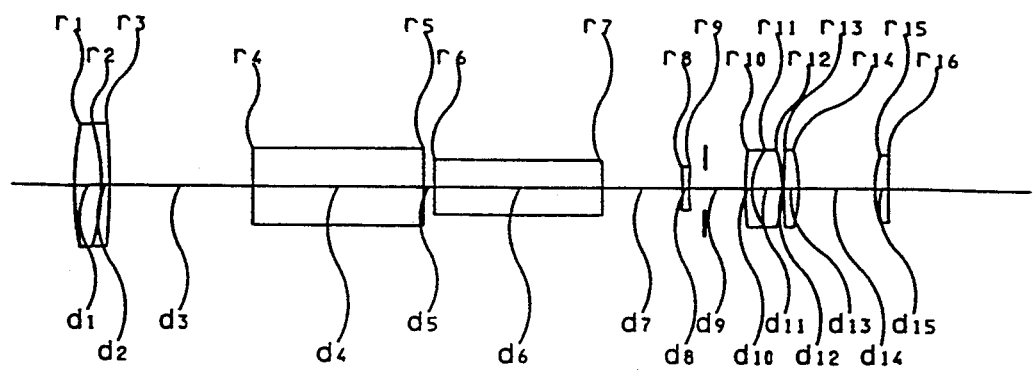
FIGS. 13 through 18 show the second example of the lens arrangement.
Figure 15:
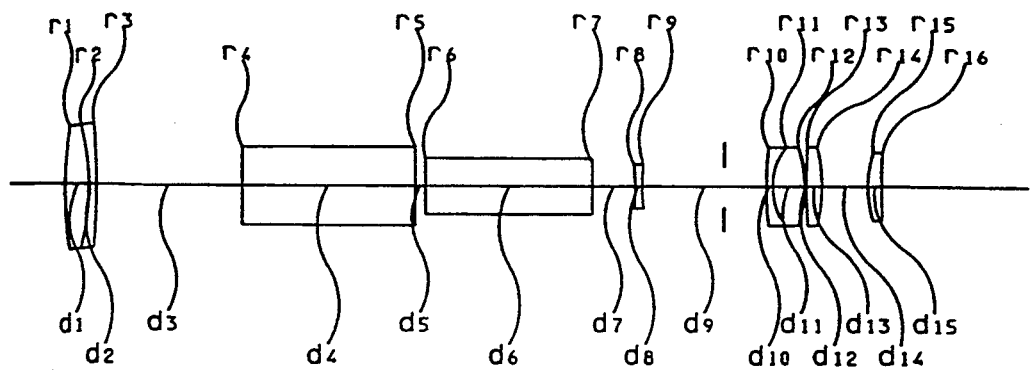
Figure 17:
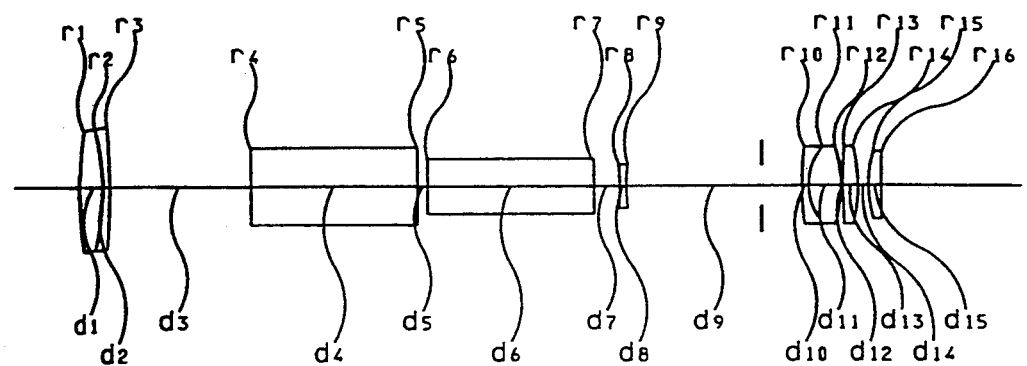

FIGS. 13, 15, and 17 show the second lens arrangement of the variable power optical system of the present invention. FIG. 13 shows the arrangement at the low magnification; FIG. 15 shows an arrangement at the middle magnification; FIG. 17 shows an arrangement at the high magnification.

The values related tot he above figures are shown in Table 4. The legends in Table 4 are the same as Table 1.

In the first arrangement of lens, magnification is changed in accordance with as the changes of d7, d9, and d14. The values, showing the changes, are shown in Table 5. The surfaces, from the fourth to the seventh, are the surfaces of an erect prism.

Figure 14:
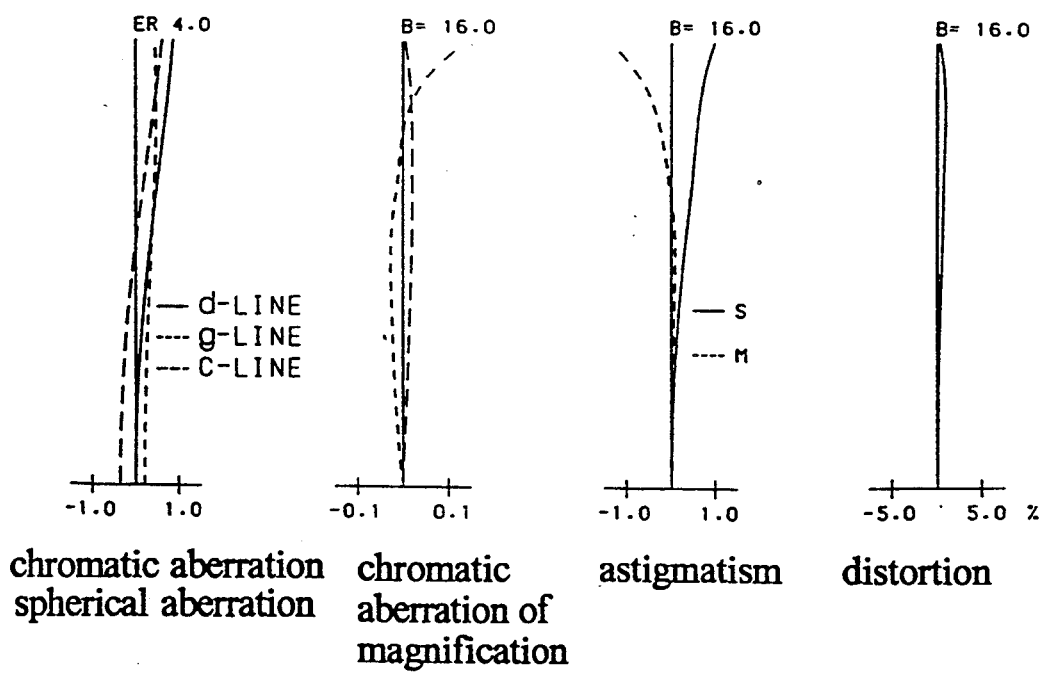
Figure 16:
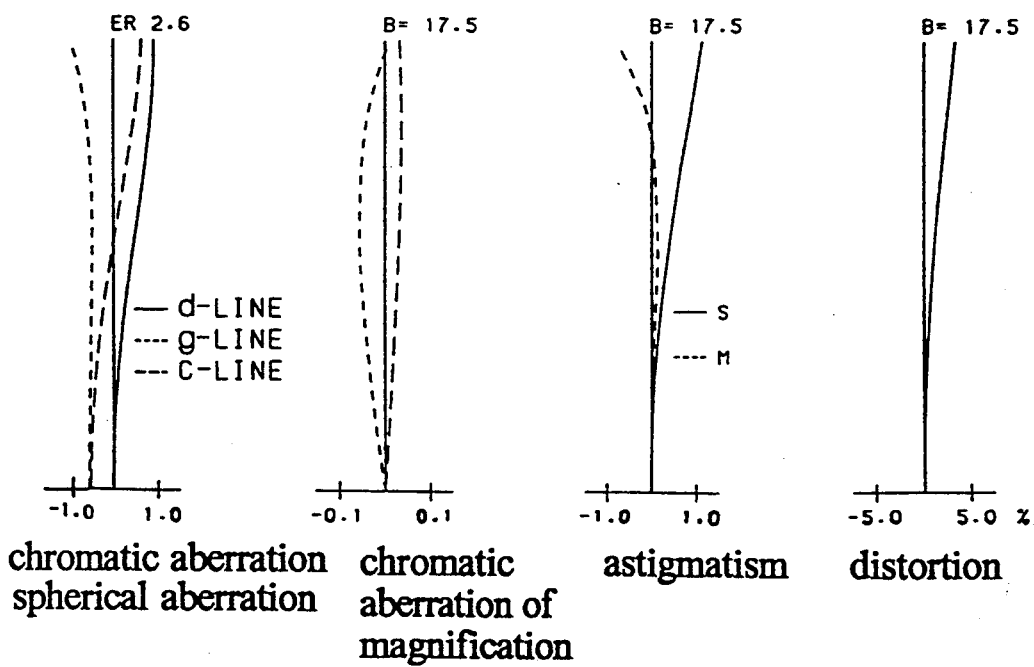
Figure 18:
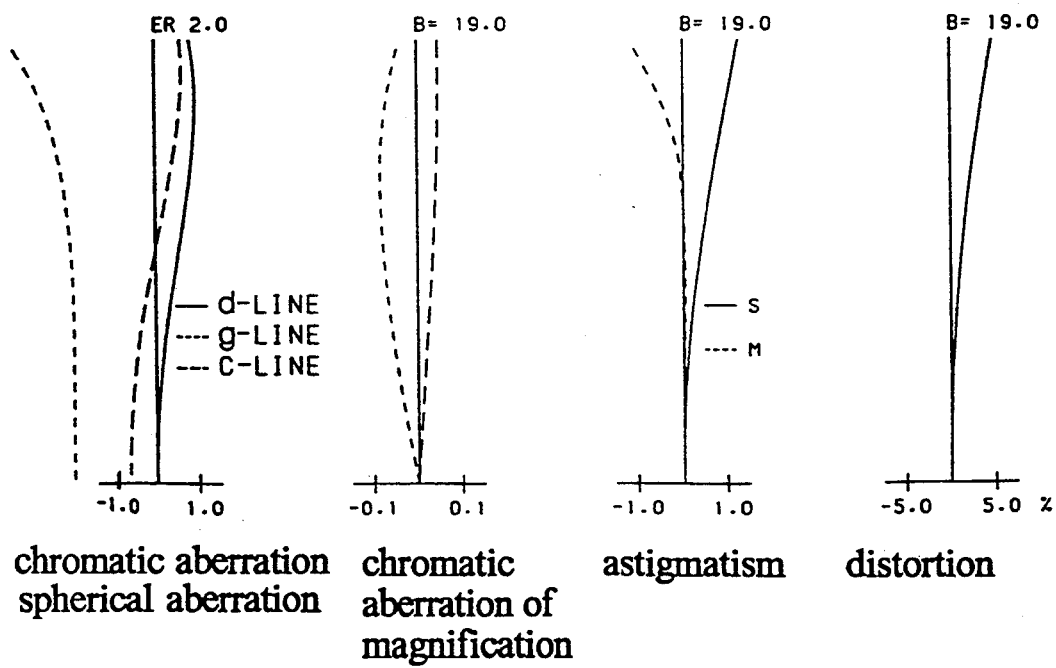

Aberrations in low magnification, in this arrangement, are shown in FIG. 14, the middle magnification in FIG. 16, and the high magnification in FIG. 18, respectively.

TABLE 4

| Surface No. | r | d | n | ν |
|---|---|---|---|---|
| 1 | 57.232 | 4.99 | 1.51633 | 64.1 |
| 2 | −36.823 | 1.45 | 1.62004 | 36.3 |
| 3 | −116.590 | 25.89 | | |
| 4 | infinity | 29.93 | 1.56883 | 56.3 |
| 5 | infinity | 1.81 | | |
| 6 | infinity | 29.93 | 1.56883 | 56.3 |
| 7 | infinity | variable | | |
| 8 | −41.540 | 1.81 | 1.51633 | 64.1 |
| 9 | 26.168 | variable | | |
| 10 | 55.235 | 1.18 | 1.80518 | 25.4 |
| 11 | 10.857 | 5.62 | 1.71300 | 53.8 |
| 12 | −22.194 | 0.36 | | |
| 13 | 145.117 | 2.63 | 1.51633 | 64.1 |
| 14 | −26.719 | variable | | |
| 15 | 19.391 | 2.36 | 1.51633 | 64.1 |
| 16 | 141.943 | | | |

TABLE 5

| | Magnification | | |
|---|---|---|---|
| | Low | Middle | High |
| $f_o$ | 100.00 | 131.84 | 155.83 |
| $f_e$ | 16.45 | 14.68 | 13.14 |
| ω (°) | 2.67 | 1.94 | 1.58 |
| d7 | 14.31 | 7.77 | 4.61 |
| d9 | 10.23 | 22.23 | 31.36 |
| d14 | 13.37 | 7.09 | 1.93 |

Table 6 shows the distance between the field stop ring and the phase "r10" which is the closest to the object's side in the eye piece optical system.

TABLE 6

| | Magnification | | |
|---|---|---|---|
| | Low | Middle | High |
| r10 | −7.25 | −7.79 | −8.33 |

Third Example of The Lens Arrangement

Figure 19:
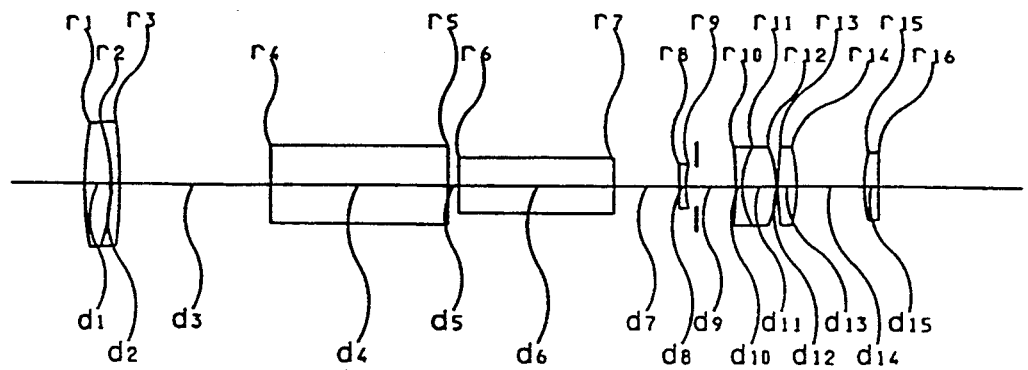
FIGS. 19 through 24 are showing the third example of the lens arrangement.
Figure 21:
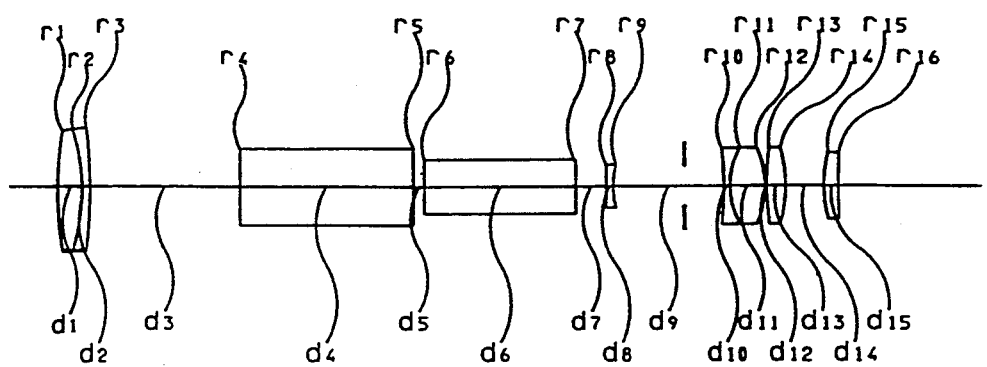
Figure 23:
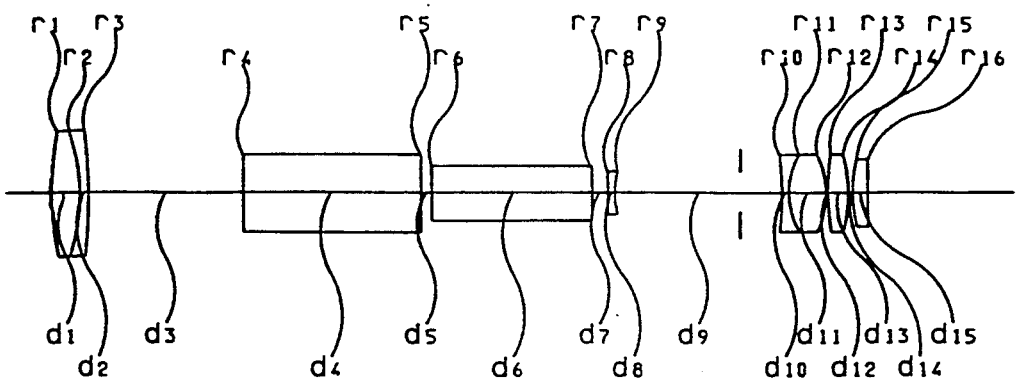

FIGS. 19, 21, and 23 show the third lens arrangement of the variable power optical system of the present invention. FIG. 19 shows an arrangement at the low magnification; FIG. 21 shows an arrangement at the middle magnification; and FIG. 23 shows an arrangement at the high magnification.

The values related to the above figures are shown in Table 7. In the third example, among the five lenses of the eye piece optical system, the first lens, which is the closest to an object, and the fourth lens are made of synthetic resin. The legends in Table 7 are the same as Table 1. In the third arrangement of lens, magnification is changed in accordance with the changes of d7, d9, and d14. The values showing the changes are shown in Table 8. The surfaces from the fourth to the seventh are surfaces of an erect prism.

Figure 20:
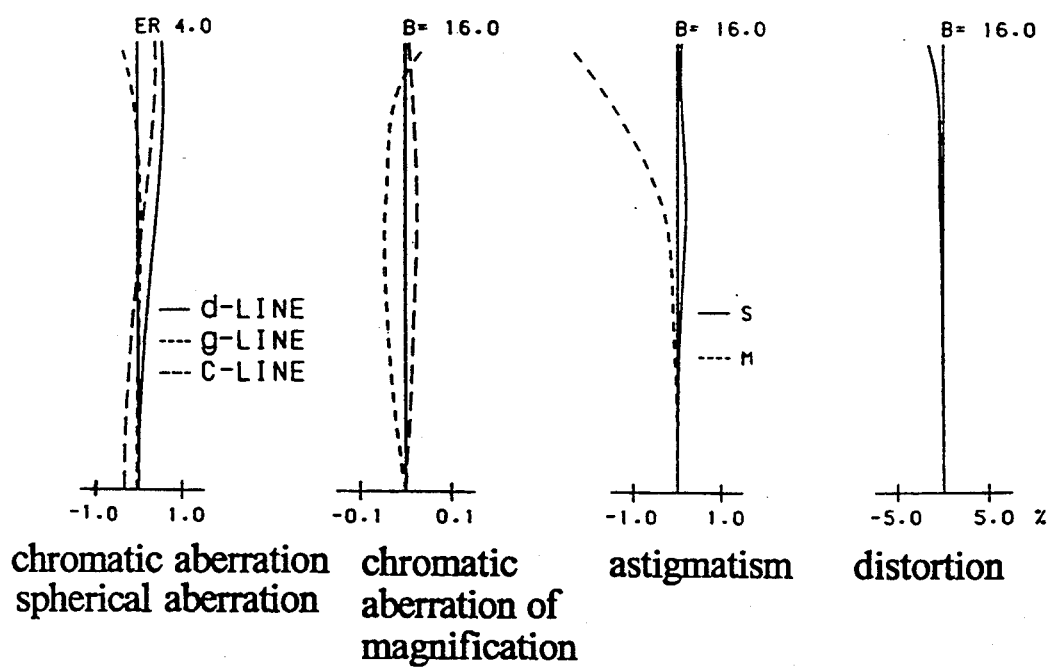
Figure 22:
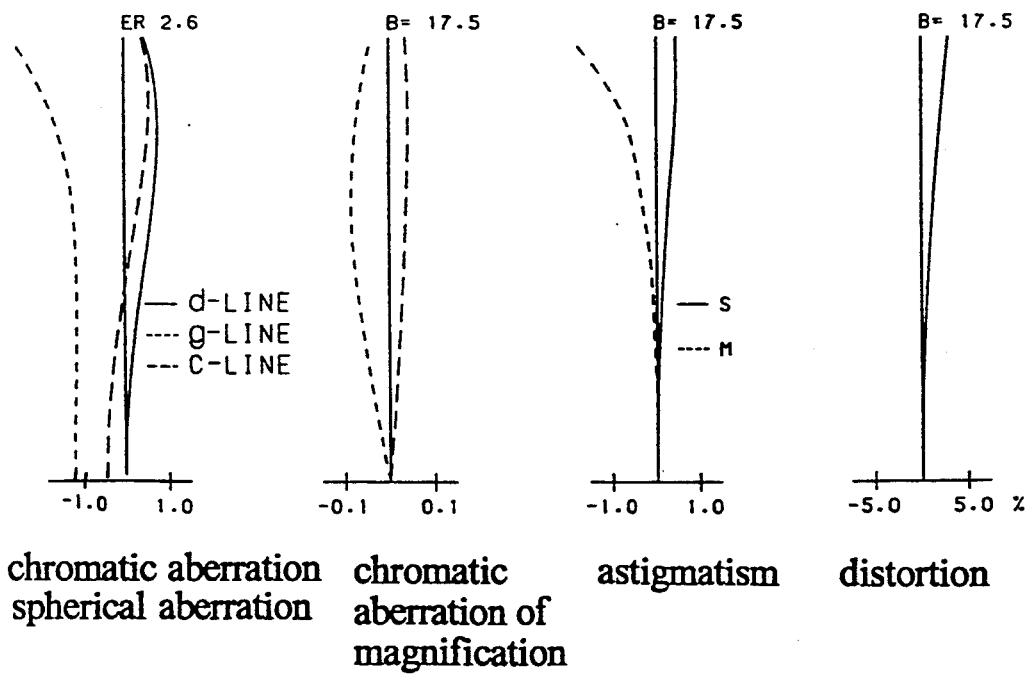
Figure 24:
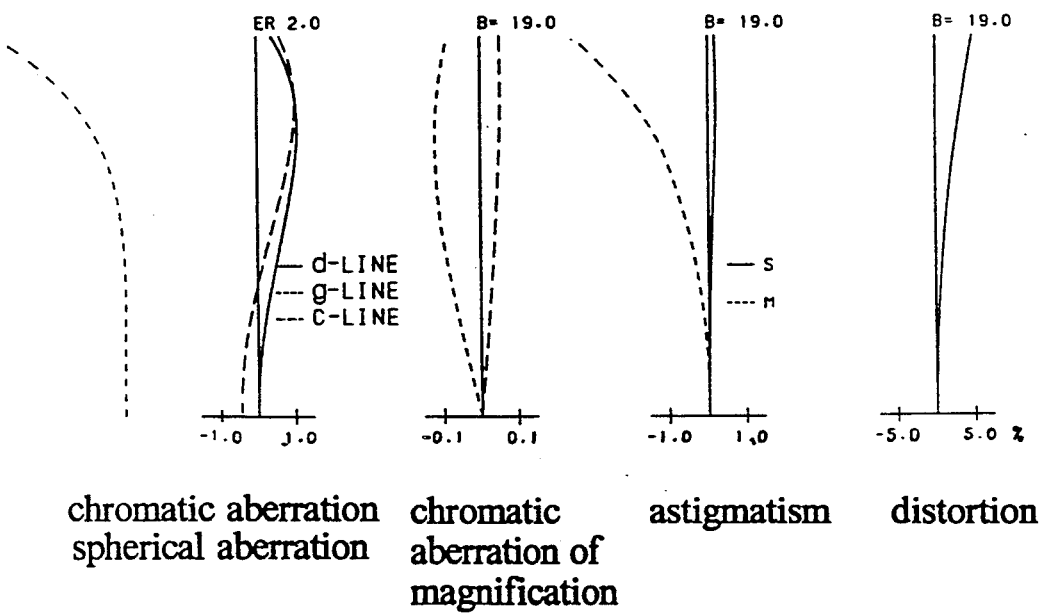

Aberrations in low magnification of this arrangement are shown in FIG. 20, the middle magnification in FIG. 22, and the high magnification in FIG. 24, respectively.

TABLE 7

| Surface No. | r | d | n | ν |
|---|---|---|---|---|
| 1 | 64.573 | 5.24 | 1.51633 | 64.1 |
| 2 | −33.768 | 1.52 | 1.62004 | 36.3 |
| 3 | −95.352 | 28.57 | | |
| 4 | infinity | 32.38 | 1.56883 | 56.3 |
| 5 | infinity | 1.91 | | |
| 6 | infinity | 28.57 | 1.56883 | 56.3 |
| 7 | infinity | variable | | |

TABLE 7-continued

| Surface No. | r | d | n | ν |
|---|---|---|---|---|
| 8 | −160.979 | 1.24 | 1.492 | 54.7 |
| 9 | 14.802 | variable | | |
| 10 | −63.592 | 1.24 | 1.80518 | 25.4 |
| 11 | 14.263 | 6.57 | 1.71300 | 53.8 |
| 12 | −17.104 | 0.38 | | |
| 13 | 50.774 | 3.52 | 1.492 | 57.4 |
| 14 | −27.452 | variable | | |
| 15 | 24.422 | 2.67 | 1.51633 | 64.1 |
| 16 | 186.044 | | | |

TABLE 8

| | Magnification | | |
|---|---|---|---|
| | Low | Middle | High |
| $f_o$ | 100.00 | 136.95 | 165.18 |
| $f_e$ | 16.66 | 15.28 | 13.96 |
| ω (°) | 2.67 | 1.94 | 1.58 |
| d7 | 12.35 | 5.78 | 2.75 |
| d9 | 9.55 | 21.55 | 30.82 |
| d14 | 12.51 | 7.07 | 0.84 |

Table 9 shows the distance between the field stop ring and the phase "r10" which is the closest to the object's side in the eye piece optical system.

TABLE 9

| | Magnification | | |
|---|---|---|---|
| | Low | Middle | High |
| r10 | −7.00 | −7.52 | −8.01 |

We claim:

1. A zooming monocular or zooming binoculars having an objective optical system and an eyepiece optical system, comprising:
   at least one variable power lens group movably driven in an optical axis in the eyepiece optical system;
   a movable field stop which is provided to define the field of view so as to move in the optical axis direction independently of the variable power lens group; and
   driving means for moving said movable field stop in association with the movement of the movable variable power lens group in the optical axis direction along a track different from a track of the moveable power lens group.

2. A zooming monocular or zooming binoculars according to claim 1, wherein said movable field stop, observed through the eyepiece optical system is moved to a position in which no dimming of the contour of said movable field stop takes place, regardless of the position of the variable power lens group.

3. A zooming monocular or zooming binoculars according to claim 1, wherein said movable field stop is moved to a position where an image of an object at a specific distance, which is formed by the objective optical system, is formed.

4. A zooming monocular or zooming binoculars according to claim 1, wherein the objective optical system comprises at least one variable power lens group, and the movable field stop is located between the variable power lens group of the objective optical system and the variable power lens group of the eyepiece optical system.

5. A zooming monocular or zooming binoculars according to claim 4, wherein the magnification increases as the variable power lens group of the objective optical system moves forwardly, and the variable power lens group of the eyepiece optical system moves rearwardly to increase spatial distance therebetween.

6. A zooming monocular or zooming binoculars according to claim 5, wherein said movable field stop is moved rearwardly when the magnification increases.

7. A zooming monocular or zooming binoculars according to claim 5, wherein the rearward displacement of said movable field stop is smaller than that of the variable power lens group of the eyepiece optical system.

8. A zooming monocular or zooming binoculars according to claim 4, wherein said driving means of said movable field stop comprises a guide pin provided on said movable field stop, a non-rotatable inner cylinder which has a linear movement guide groove in which said guide pin is movable guided in the optical axis direction, an intermediate cylinder which is rotatably fitted on the inner cylinder and which has a cam groove in which said guide pin is fitted, and a rotational operating means for rotating the intermediate cylinder.

9. A zooming monocular or zooming binoculars according to claim 1, wherein said driving means of said movable field stop comprises a guide pin provided on said movable field stop, a non-rotatable inner cylinder which has a linear movement guide groove in which said guide pin is moveably guided in the optical axis direction, an intermediate cylinder which is rotatably fitted on the inner cylinder and which has a cam groove in which said guide pin is fitted, and a rotational operating means for rotating the intermediate cylinder.

10. A zooming monocular or zooming binoculars according to claim 9, wherein the pair of variable power lens groups have respective guide pins.

11. A zooming monocular or zooming binoculars according to claim 10, wherein said non-rotatable inner cylinder is provided with a pair of linear movement guide grooves in which said guide pins of the variable power lens groups are fitted.

12. A zooming monocular or zooming binoculars according to claim 11, wherein said intermediate cylinder has cam grooves in which said guide pins of the variable power lens groups are fitted.

13. A zooming monocular or zooming binoculars according to claim 1, wherein said objective optical system is located on the object side form the field stop, and the eyepiece optical system is located on the eye side of a photographer, from said movable field stop.

14. A zooming monocular or zooming binoculars according to claim 13, wherein a standard diopter for an image of the object at a specific distance, which is not varied by the change of magnification, and a diopter of the field stop, which is observed through the eyepiece optical system are set to be identical.

15. A zooming monocular or zooming binoculars comprising:
   an objective optical system including a movable variable power lens group;
   an eyepiece optical system including a movable variable power lens group;
   a movable field stop, which defines the field of view, being located between the variable power lens groups of the objective optical system and the eyepiece optical system;
   an inner cylinder in which the movable variable power lens groups and said movable field stop are fitted to as to move in the optical axis direction independently of one another and, a single driving means for independently moving the movable variable power lens groups and said movable field stop in the optical axis direction.

16. A zooming monocular or zooming binoculars according to claim 15, wherein said single driving means comprises a rotatable zoom ring and a cam mechanism which drives the variable power lens groups and said movable field stop in accordance with the rotation of the zoom ring.

17. A zooming monocular or zooming binoculars according to claim 16, wherein said cam mechanism comprises an intermediate cylinder which is rotated in association with the rotation of the zoom ring and cam grooves which are formed on the intermediate cylinder for the variable power lens groups and the movable field stop.

18. A zooming monocular or zooming binoculars according to claim 17, wherein said movable field stop is moved to a position in which no dimming of the contour thereof occurs, independently of the position of the variable power lens groups.

19. A zooming monocular or zooming binoculars according to claim 15, wherein said single driving means comprises the intermediate cylinder rotatably provided on the outer periphery of the inner cylinder;
frame bodies which independently support the variable power lens groups and said movable field stop;
plural guide pins which radially protrude from the frame bodies;
linear movement guide grooves which are formed on the inner cylinder, and in which said guide pins are movably engaged;
cam grooves which are formed on the intermediate cylinder, and in which said guide pins are moveably engaged; and
a rotatable driving means for rotating the intermediate cylinder.

20. A zooming monocular or zooming binoculars according to claim 19, wherein said cam grooves formed on the intermediate cylinder have bottom surfaces, and said guide pins, which are engaged in said cam grooves, are pressed in the optical axis direction, by biasing means disposed between the bottom surfaces of the cam grooves and the guide pins.

21. A zooming monocular or zooming binoculars according to claim 20, wherein the inner cylinder has an inner diameter so as not to be in contact with the frame bodies, and the frame bodies are supported in a position so as not to be in contact with the inner cylinder, by the biasing means.

22. A zooming monocular or zooming binoculars comprising:
an objective optical system which includes at least one variable power lens group;
an eyepiece optical system which includes at least one variable power lens group;
a pair of frame bodies which supports each of the variable power lens groups;
an inner cylinder which contains the frame bodies in such a way so as not to be in contact;
a plurality of linear movement guide grooves which are formed on the inner cylinder, and said plurality of linear movement guide grooves linearly move the pair of frame bodies;
an immediate cylinder which is rotatably provided on the outer periphery of the inner cylinder;
cam grooves having bottom surfaces, said cam grooves being formed on the intermediate cylinder corresponding to the linear movement guide grooves;
guide pins which radially protrude form the pair of frame bodies, said guide pins being inserted in the plurality of linear movement guide grooves and said cam grooves having bottom surfaces in series; and
a plurality of biasing means which are inserted between the bottom surfaces of the cam grooves and the guide pins, so that the pair of frame bodies are biased toward the optical axis.

23. A zooming monocular or zooming binoculars according to claim 22, further comprising a frame body which has a movable field stop, which delimits the field of view, with the frame body being disposed between the pair of frame bodies and inserted in the same manner as the pair of frame bodies, and the frame body having a plurality of said guide pins which radially protrude;
linear movement guide grooves which are formed on the inner cylinder, such that the linear movement guide grooves are made to correspond to said guide pins of the frame body of said movable field stop;
cam grooves having bottom surfaces which are formed on the intermediate cylinder, with said cam grooves having bottom surfaces being made to correspond to said guide pins of the frame body of said movable field stop; and
a plurality of biasing means which are disposed between said guide pins and the bottom surfaces of said cam grooves, so that the frame of said movable field stop is biased toward the optical axis.

24. A zooming monocular or zooming binoculars according to claim 22, wherein said objective optical system is located on the object side from the movable field stop, and the eyepiece optical system is located on the eye side of a photographer from said movable field stop.

25. A zooming monocular or zooming binoculars according to claim 24, wherein a standard diopter for an image of the object at a specific distance, which is not varied by the change of magnification, and a diopter of the field stop, which is observed through the eyepiece optical are set to be identical.

* * * * *

UNITED STATES PATENT AND TRADEMARK OFFICE
CERTIFICATE OF CORRECTION

PATENT NO. : 5,140,467
DATED : August 18, 1992
INVENTOR(S) : K. HOTTA et al.

It is certified that error appears in the above-indentified patent and that said Letters Patent is hereby corrected as shown below:

Column 9, line 50 (claim 2, line 3), insert ---,--- after "system".
Column 10, line 17 (claim 8, line 6), change "movable" to ---moveably---.
Column 10, line 46 (claim 13, line 3), change "form" to ---from---.
Column 10, line 67 (claim 15, line 13), change "to" (first occurrence) to ---so---.
Column 11, line 12 (claim 17, line 13), insert ---,--- after "cylinder".
Column 11, line 13 (claim 17, line 4), insert ---,--- after "ring".
Column 12, line 15 (claim 22, line 21), change "form" to ---from---.
Column 12, line 49 (claim 24, line 5), insert ---,--- after "photographer".

Signed and Sealed this

Eighth Day of August, 1995

*Attest:*

BRUCE LEHMAN

*Attesting Officer*  *Commissioner of Patents and Trademarks*